(12) United States Patent  (10) Patent No.: US 8,632,916 B2
Takahashi et al.  (45) Date of Patent: Jan. 21, 2014

(54) LITHIUM ION POLYMER BATTERY

(75) Inventors: Kentaro Takahashi, Sumoto (JP); Shinya Furukawa, Sumoto (JP)

(73) Assignee: SANYO Electric Co., Ltd., Moriguchi-shi, Osaka (JP)

( * ) Notice: Subject to any disclaimer, the term of this patent is extended or adjusted under 35 U.S.C. 154(b) by 168 days.

(21) Appl. No.: 12/977,431

(22) Filed: Dec. 23, 2010

(65) Prior Publication Data

US 2011/0183212 A1 Jul. 28, 2011

(30) Foreign Application Priority Data

Jan. 28, 2010 (JP) ................................. 2010-017453

(51) Int. Cl.
*H01M 6/14* (2006.01)
(52) U.S. Cl.
USPC ........ 429/300; 429/231.1; 429/317; 429/316; 429/188
(58) Field of Classification Search
USPC ............... 429/231.1, 317, 163, 316, 188, 300
See application file for complete search history.

(56) References Cited

U.S. PATENT DOCUMENTS

| | | | |
|---|---|---|---|
| 6,316,140 B1 * | 11/2001 | Hatazawa et al. ............. | 429/163 |
| 6,399,241 B1 * | 6/2002 | Hara et al. .................... | 429/163 |
| 6,680,147 B2 * | 1/2004 | Lee ............................... | 429/303 |
| 7,510,799 B2 * | 3/2009 | Hatta et al. .................... | 429/181 |
| 7,563,539 B2 * | 7/2009 | Kameyama et al. ....... | 429/231.1 |
| 2002/0150820 A1 * | 10/2002 | Kanai et al. ................ | 429/231.1 |
| 2006/0019153 A1 * | 1/2006 | Imachi et al. ................. | 429/128 |
| 2008/0057385 A1 * | 3/2008 | Aramata et al. ............. | 429/129 |
| 2009/0117463 A1 * | 5/2009 | Takezawa et al. ............ | 429/220 |

FOREIGN PATENT DOCUMENTS

| | | |
|---|---|---|
| JP | 9-199112 A | 7/1997 |
| JP | 2002-319405 A | 10/2002 |
| JP | 2007-242303 A | 9/2007 |
| JP | 2007-280830 A | 10/2007 |
| JP | 2007-305453 A | 11/2007 |

OTHER PUBLICATIONS

JP 09-199112A Raw machine translation, original patent is in IDS.*

* cited by examiner

*Primary Examiner* — Patrick Ryan
*Assistant Examiner* — Alex Usyatinsky
(74) *Attorney, Agent, or Firm* — Westerman, Hattori, Daniels LLP

(57) ABSTRACT

The lithium ion polymer battery includes a positive electrode plate formed with a positive electrode mixture layer having a lithium composite oxide as a positive electrode active material, a negative electrode plate, a separator, and a gel nonaqueous electrolyte, the positive electrode active material having an average particle diameter of 4.5 to 15.5 μm and a specific surface area of 0.13 to 0.80 m$^2$/g, the positive electrode mixture layer containing at least one of aluminum, titanium, or zirconium based coupling agent having an alkyl or an alkoxy groups having 1 to 18 carbon atoms at a content of 0.01% or more and 5% or less by mass with respect to the mass of the positive electrode active material, and the gel nonaqueous electrolyte being formed from a nonaqueous electrolyte containing a monomer having a (meth)acrylic end group. Thus improved nail penetration characteristics and superior cycle characteristics are obtained.

6 Claims, No Drawings

LITHIUM ION POLYMER BATTERY

TECHNICAL FIELD

The present invention relates to a lithium ion polymer battery including a lithium composite oxide as a positive electrode active material and using a gel electrolyte. More particularly, the invention relates to a lithium ion polymer battery including a lithium composite oxide as a positive electrode active material and using an electrolyte that is converted into gel by a gelling agent containing a (meth)acrylic end group in which nail penetration characteristics are improved and superior cycle characteristics are obtained.

BACKGROUND ART

Recently, as power supplies for driving portable electronic equipment, such as cell phones, portable personal computers, and portable music players, and further, as power supplies for hybrid electric vehicles (HEVs) and electric vehicles (EVs), nonaqueous secondary batteries represented by lithium ion secondary batteries having a high energy density and high capacity are widely used.

As for the positive electrode active material in these non-aqueous secondary batteries, one of or a mixture of a plurality of lithium transition-metal composite oxides represented by $LiMO_2$ (where M is at least one of Co, Ni, and Mn), (namely, $LiCoO_2$, $LiNiO_2$, $LiNi_yCo_{1-y}O_2$ (y=0.01 to 0.99), $LiMnO_2$, $LiMn_2O_4$, $LiCo_xMn_yNi_zO_2$ (x+y+z=1)), phosphoric acid compounds having an olivine structure such as $LiFePO_4$, and the like, all of which can reversibly absorb and desorb lithium ions, is used.

Carbonaceous materials such as graphite and amorphous carbon are widely used as the negative electrode active material in nonaqueous secondary batteries. The reason is that carbonaceous materials have discharge potential equal to that of a metal lithium or a lithium alloy but do not cause dendrite growth, and thus, carbonaceous materials have superior characteristics of high safety, superior initial efficiency, good potential flatness, and high density.

As a nonaqueous solvent for a nonaqueous electrolyte, carbonates (also referred to as carbonic acid esters), lactones, ethers, esters, and the like are used alone or in mixtures of two or more. Among them, carbonates are widely used because they have an especially high dielectric constant and provide larger ion conductivity to the nonaqueous electrolyte. A gel electrolyte, a so-called polymer electrolyte, is used as the nonaqueous electrolyte, particularly in a nonaqueous secondary battery using a laminated outer body for securing safety for liquid leakage (see JP-A-2007-305453). Hereinafter, a nonaqueous secondary battery using a laminated outer body and a polymer electrolyte is referred to as a "lithium ion polymer battery".

JP-A-2007-305453 discloses that a coupling agent such as a silane coupling agent, an aluminum coupling agent, and a titanium coupling agent is added to an active material mixture slurry in a lithium ion polymer battery. JP-A-2007-242303 discloses an example in which a positive electrode active material is treated with a silane coupling agent having a plurality of bonding groups in order to improve cycle characteristics when intermittent cycles of a nonaqueous secondary battery are repeated. JP-A-09-199112 discloses an example in which a positive electrode active material is mixed with an aluminum coupling agent in order to improve cycle characteristics when a nonaqueous secondary battery is charged and discharged at high voltage under heavy load.

JP-A-2002-319405 discloses an example in which a silane coupling agent having an organic reactive group such as an epoxy group and amino group and a bonding group such as a methoxy group and ethoxy group is dispersed in a positive electrode mixture in order to improve wettability of a positive electrode with a nonaqueous electrolyte in a nonaqueous secondary battery at low temperature and to improve output characteristics at low temperature. Furthermore, JP-A-2007-280830 discloses an example in which a silane coupling agent is present near a broken surface of a positive electrode active material occurring when a positive electrode mixture layer is compressed in order to improve cycle characteristics of a nonaqueous secondary battery.

In the invention disclosed in JP-A-2007-305453, adhesiveness between an electrode and a gel electrolyte is improved and thus a lithium ion polymer battery in which an increase in battery resistance and an increase in thickness are suppressed can be obtained. However, JP-A-2007-305453 does not describe improvement of nail penetration characteristics of a lithium ion polymer battery. The nail penetration characteristics show the degree of smoking or burning when a nail penetrates a battery. In the nail penetration characteristics test, a forced internal short circuit is caused inside a battery, and thus, the temperature becomes abnormally high locally inside the battery. Therefore, nail penetration characteristics are one indicator that shows the degree of battery thermal runaway.

The inventions disclosed in JP-A-2007-242303, JP-A-09-199112, JP-A-2002-319405, and JP-A-2007-280830 show that mixing a silane or aluminum coupling agent in a positive electrode mixture can possibly lead to an improvement in cycle characteristics and output characteristics in a low temperature environment to some extent. However, JP-A-2007-242303, JP-A-09-199112, JP-A-2002-319405, and JP-A-2007-280830 provide no description on nail penetration characteristics of nonaqueous secondary batteries in which a silane or aluminum coupling agent is mixed in a positive electrode mixture.

The inventors of the invention have carried out various studies in order to ensure cycle characteristics and nail penetration characteristics of a lithium ion polymer battery using such a gel electrolyte. As a result, the inventors have found that the problems mentioned above can be solved when a positive electrode mixture contains a predetermined amount of an aluminum coupling agent, the average particle diameter and the specific surface area of the positive electrode active material including a lithium composite oxide are maintained in a predetermined range, and a gel nonaqueous electrolyte formed from a nonaqueous electrolyte containing a monomer having a (meth)acrylic end group is used, whereby the invention has been achieved.

SUMMARY

An advantage of some aspects of the invention is to provide a lithium ion polymer battery including a lithium composite oxide as a positive electrode active material and using a gel electrolyte that has improved nail penetration characteristics and superior cycle characteristics.

According to an aspect of the invention, a lithium ion polymer battery of the invention includes a positive electrode plate formed with a positive electrode mixture layer having a lithium composite oxide as a positive electrode active material, a negative electrode plate, a separator, and a gel nonaqueous electrolyte. In the lithium ion polymer battery, the positive electrode active material has an average particle diameter of 4.5 to 15.5 μm and a specific surface area of 0.13 to 0.80 m²/g, the positive electrode mixture layer contains at least one coupling agent represented by General Formula (I) at a content of 0.01% by mass or more and 5% by mass or less with respect to the mass of the positive electrode active material, and the gel nonaqueous electrolyte is formed from a nonaqueous electrolyte containing a monomer having a (meth)acrylic end group.

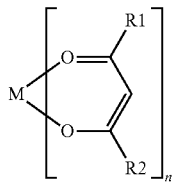

(where M is one atom selected from Al, Ti, and Zr, each of R1 and R2 is an alkyl group or an alkoxy group having 1 to 18 carbon atoms, and n represents an integer of 1 to 4).

In the lithium ion polymer battery of the invention, the positive electrode mixture layer is required to contain a coupling agent including at least one coupling agent represented by General Formula (I). When the positive electrode mixture layer does not contain such a coupling agent or contains other coupling agents, both the nail penetration characteristics and the cycle characteristics decrease even if the other conditions of the invention are satisfied.

In the lithium ion polymer battery of the invention, the positive electrode mixture layer is required to contain at least one coupling agent represented by General Formula (I) at a content of 0.01% by mass or more and 5% by mass or less with respect to the mass of the positive electrode active material. When the content of such a coupling agent is less than 0.01% by mass with respect to the mass of the positive electrode active material, the content is too low to provide the addition effect of the coupling agent even if the other conditions of the invention are satisfied. When the content of such a coupling agent is more than 5% by mass with respect to the mass of the positive electrode active material, the coupling agent does not affect electrode reactions and the added amount of the positive electrode active material is reduced accordingly, and furthermore, positive electrode resistance becomes large to reduce initial capacity even if the other conditions of the invention are satisfied. The added amount of the coupling agent is more preferably 0.02% by mass or more and 1.0% by mass or less, and even more preferably 0.1% by mass or more and 0.5% by mass or less, with respect to the mass of the positive electrode active material.

Such an effect by mixing the coupling agent in a positive electrode mixture layer is supposed to be provided for the following reasons. It is supposed that when a positive electrode mixture contains the coupling agent of the invention, functional groups such as a hydroxy group and a carboxyl group on a surface of the positive electrode active material are reacted with the coupling agent, as a result, monomers are readily polymerized to reduce residual monomers, and thus cycle characteristics are improved. Furthermore, it is considered that, when a coupling agent is added to a positive electrode mixture layer, the adhesive strength between a separator and a positive electrode plate is improved, and short circuit heat at the time of nail penetration thermally decomposes a part of a coupling agent into alumina, titania, or zirconia to form an insulating layer between a polymer electrolyte and a positive electrode mixture, then short circuit resistance is effectively increased between the positive electrode mixture layer and the negative electrode binder layer, and thus the nail penetration characteristics can be significantly improved.

In the lithium ion polymer battery of the invention, the positive electrode active material is required to have an average particle diameter of 4.5 to 15.5 μm and a specific surface area of 0.13 to 0.80 m²/g. When the positive electrode active material has an average particle diameter of less than 4.5 μm, even when the conditions of the invention other than this are satisfied, both the cycle characteristics and the nail penetration characteristics decrease. The nail penetration characteristics are good but the cycle characteristics start to decline when the positive electrode active material has an average particle diameter of more than 15.5 μm even if the other conditions of the invention are satisfied.

In the lithium ion polymer battery of the invention, the nail penetration characteristics are good but the cycle characteristics decrease when the positive electrode active material has a specific surface area of less than 0.13 m²/g even if the other conditions of the invention are satisfied. Both the nail penetration characteristics and the cycle characteristics decrease when the positive electrode active material has a specific surface area of more than 0.80 m²/g even if the other conditions of the invention are satisfied.

Such an effect obtained by limiting the average particle diameter and the specific surface area of the positive electrode active material is supposed to be provided for the following reasons. When the positive electrode active material has an excessively small average particle diameter or an excessively large specific surface area, the short circuit current when a nail is penetrated becomes excessively large. Consequently, the formation speed of the insulating layer formed from the thermal decomposition of a coupling agent lags behind the heat generation speed, and thus the improved effect of the nail penetration characteristics is not provided. When the positive electrode active material has an excessively large average particle diameter or an excessively small specific surface area, the formed positive electrode surface film has increased resistance, and thus, the cycle characteristics decrease.

Preferred positive electrode active materials used in the lithium ion polymer battery of the invention include lithium composite oxides such as $LiCoO_2$, $LiNiO_2$, $LiMn_2O_4$, $LiMnO_2$, $LiNi_{1-x}Mn_xO_2$ (0<x<1), $LiNi_{1-x}Co_xO_2$ (0<x<1), and $LiNi_xMn_yCo_zO_2$ (0<x, y, z<1, x+y+z=1).

Examples of the negative electrode active material usable in the lithium ion polymer battery of the invention include carbon materials such as graphite, non-graphitizable carbon, and graphitizable carbon; titanium oxides such as $LiTiO_2$ and $TiO_2$; metalloid elements such as silicon and tin; and a Sn—Co alloy.

In the lithium ion polymer battery of the invention, examples of the nonaqueous solvent include cyclic carbonates such as ethylene carbonate (EC), propylene carbonate (PC), and butylene carbonate (BC); fluorinated cyclic carbonates; cyclic carboxylic acid esters such as γ-butyrolactone (BL) and γ-valerolactone (VL); chain carbonates such as dimethyl carbonate (DMC), ethyl methyl carbonate (EMC), diethyl carbonate (DEC), methyl propyl carbonate (MPC), and dibutyl carbonate (DNBC); fluorinated chain carbonates; chain carboxylic acid esters such as methyl pivalate, ethyl pivalate, methyl isobutyrate, and methyl propionate; amide compounds such as N,N'-dimethylformamide and N-methyloxazolidinone; sulfur compounds such as sulfolane; and ambient temperature molten salts such as 1-ethyl-3-methylimidazolium tetrafluoroborate. These solvents are desirably used in mixtures of two or more. Among them, cyclic carbonates such as EC and PC, fluorinated cyclic carbonates, chain carbonates, fluorinated chain carbonates, and tertiary carboxylic acid esters are specifically preferred.

As a separator used in the lithium ion polymer battery of the invention, microporous membrane separators formed from polyolefin materials such as polypropylene and polyethylene may be selected. The separator may be mixed with a resin having a low melting point in order to ensure the shutdown response of the separator, and may be laminated with a high-melting resin or be a resin supported with inorganic particles in order to obtain heat resistance.

The nonaqueous electrolyte used in the lithium ion polymer battery of the invention may further includes, as a compound for stabilizing electrodes, vinylene carbonate (VC), vinyl ethyl carbonate (VEC), succinic anhydride (SUCAH), maleic anhydride (MAAH), glycolic anhydride, ethylene sulfite (ES), divinyl sulfone (VS), vinyl acetate (VA), vinyl pivalate (VP), catechol carbonate, biphenyl (BP), and the like. These compounds may be properly used in mixtures of two or more.

As an electrolyte salt dissolved in the nonaqueous solvent used in the lithium ion polymer battery of the invention, lithium salts that are commonly used as an electrolyte salt in a nonaqueous secondary battery may be used. Examples of such a lithium salt include $LiPF_6$, $LiBF_4$, $LiCF_3SO_3$, $LiN(CF_3SO_2)_2$, $LiN(C_2F_5SO_2)_2$, $LiN(CF_3SO_2)(C_4F_9SO_2)$, $LiC(CF_3SO_2)_3$, $LiC(C_2F_5SO_2)_3$, $LiAsF_6$, $LiClO_4$, $Li_2B_{10}Cl_{10}$, $Li_2B_{12}Cl_{12}$, and mixtures of them. Among them, $LiPF_6$ (lithium hexafluorophosphate) is specifically preferred. The dissolution amount of an electrolyte salt is preferably 0.5 to 2.0 mol/L with respect to the nonaqueous solvent.

In a coupling agent having the structure of General Formula (I), M may be one atom selected from Al, Ti, and Zr, but Al is specifically preferred. When M is Al, the coupling agent can be synthesized at low cost, and better results can be obtained than when M is Ti or Zr.

In a coupling agent having the structure of General Formula (I), when at least one of R1 and R2 is an alkoxy group (such as an ethoxy group, an iso-propoxy group, and a tert-butoxy group), the coupling agent has a large effect on improving characteristics. It is preferable that an alkoxy group (such as an iso-propoxy group and a tert-butoxy group) be bonded to atom M in General Formula (I) because the reactivity to the positive electrode active material is improved. The number of alkoxy groups bonded to atom M is preferably two or less in order to improve the hydrolysis resistance of the compound.

A coupling agent may be contained in the positive electrode mixture layer in the lithium ion polymer battery of the invention by direct coating on the positive electrode plate or mixing in a positive electrode mixture slurry. The coupling agent is not specifically limited and may be diluted in any solvent for use. Suitable examples of the solvent include organic solvents including ketones such as acetone and methyl ethyl ketone (MEK), ethers such as tetrahydrofuran (THF), alcohols such as ethanol and isopropanol, and N-methyl-2-pyrrolidone (NMP) and a silicone oil.

Examples of the monomer having a (meth)acrylic end group as a gelling agent usable in the lithium ion polymer battery of the invention include monomers having an unsaturated double bond such as methyl acrylate, ethyl acrylate, 2-ethoxyethyl acrylate, 2-methoxyethyl acrylate, polyethylene glycol monoacrylate, 2-ethoxyethyl methacrylate, 2-ethoxyethyl methacrylate, polyethylene glycol monomethacrylate, N,N-diethylaminoethyl acrylate, glycidyl acrylate, allyl acrylate, acrylonitrile, diethylene glycol diacrylate, tetraethylene glycol diacrylate, polyethylene glycol diacrylate, polyethylene glycol dimethacrylate, polypropylene glycol diacrylate, polypropylene glycol dimethacrylate, polyalkylene glycol dimethacrylate, polyalkylene glycol diacrylate, trimethylolpropane alkoxylate triacrylate, pentaerythritol alkoxylate triacrylate, and pentaerythritol alkoxylate tetraacrylate.

The above-described monomer having an unsaturated bond can be polymerized by, for example, heat, ultraviolet rays, and electron beams, but a nonaqueous electrolyte may contain a polymerization initiator for an effective reaction. Examples of the usable polymerization initiator include organic peroxides such as benzoyl peroxide, t-butylperoxycumene, lauroyl peroxide, di-2-ethylhexyl peroxydicarbonate, t-butyl peroxypivalate, and t-hexylperoxyisopropyl monocarbonate.

DESCRIPTION OF EXEMPLARY EMBODIMENTS

Exemplary embodiments of the invention will now be described in detail with reference to examples and comparative examples. It should be noted that the examples described below are illustrative examples of lithium ion polymer batteries for embodying the technical spirit of the invention and are not intended to limit the invention to these examples, and the invention may be equally applied to various modifications without departing from the technical spirit described in the claims.

First, a specific method for producing a lithium ion polymer battery common to various examples and comparative examples will be described.

Preparation of Positive Electrode Plate

A positive electrode mixture was prepared by mixing 95% by mass of various positive electrode active materials, 2.5% by mass of amorphous carbon HS-100 (trade name) as a conductive material, and 2.5% by mass of polyvinylidene fluoride (PVdF). To the binder, 50% by mass of N-methylpyrrolidone (NMP) with respect to the mass of the positive electrode mixture was added to prepare a slurry. To the obtained slurry, a predetermined amount of various coupling agents was added. The whole was thoroughly stirred and then coated on both sides of an aluminum foil sheet with a thickness of 12 μm using the doctor blade method (coating amount: 400 g/m$^2$). The coated foil was heated and dried (70 to 140° C.) to remove NMP and then formed under pressure so as to have a packing density of 3.70 g/cm$^3$ (3.12 g/cm$^3$ for $LiMn_2O_4$, $LiMn_{1/3}N_{1/3}Co_{1/3}O_2$)). Then, the foil was cut into a predetermined size to give a positive electrode plate.

Here, the average particle diameter and the specific surface area of the positive electrode active material were controlled by pulverization and classification operations with Mix Muller. The average particle diameter was measured with a laser diffraction particle size analyzer, and the specific surface area was measured by the BET specific surface area measuring method using nitrogen adsorption. Consequently, the average particle diameter and the specific surface area were ascertained to be within a predetermined range.

Preparation of Negative Electrode Plate

A mixture was prepared by mixing 97% by mass of artificial graphite (d=0.335 nm), 2% by mass of carboxymethyl cellulose (CMC) as a thickener, and 1% by mass of styrene-butadiene rubber (SBR) as a binder. To the mixture, water was added to make a slurry. The slurry was coated on both sides of a copper foil having a thickness of 8 μm (coating amount: 210 g/m$^2$). Then, the coated foil was dried to remove water, compressed with a compression roller until the packing density reached 1.6 g/cm$^3$, and cut into a predetermined size to prepare a negative electrode plate.

Preparation of Battery Before Pouring

A current collecting tab was welded to each of the positive electrode plate and the negative electrode plate each having a predetermined size. The electrode plates were wound with a polyethylene microporous membrane separator having a thickness of 16 μm interposed therebetween to prepare a wound electrode assembly. The obtained wound electrode assembly was stored into a laminated outer body that was formed into a cup shape. The outer body was sealed with heat except for a pouring hole to prepare a battery before pouring.

Preparation of Battery (Meth)acrylic Polymer Electrolyte

A predetermined amount of (meth)acrylic polymer (manufactured by Shin Nakamura Chemical Co., Ltd.) was dissolved in a nonaqueous solvent of EC, PC, DMC, and methyl pivalate at a volume ratio of 30/20/30/20. $LiPF_6$ was dissolved as an electrolyte salt into the solution so as to have a concentration of 1M, and then tert-butyl peroxypivalate was mixed thereto as a polymerization initiator so as to have a content of 0.3% by mass with respect to the total mass of the electrolyte to prepare a pre-gel solution. Five milliliters of the pre-gel solution was poured through an electrolyte pouring hole, and impregnation treatment was performed. Then, the pouring hole was sealed with heat, and thermal curing was performed at 60° C. for 5 hours. Then, charging and discharging were performed to complete a lithium ion polymer battery having a design capacity of 1000 mAh (1 It=1000 mA).

PVdF Electrolyte

Thirty percent by mass of PVdF-hexafluoropropylene (HFP) polymer was dissolved to a mixed solution of dibutyl phthalate (DBP) and DMC at a mass ratio of 80:20. The solution was coated on the surface of a positive electrode plate, and then the coated plate was heated and dried to form a PVdF-HFP film having a thickness of 2 μm. Then, $LiPF_6$ was dissolved as an electrolyte salt in a nonaqueous solvent of EC, PC, DMC, and methyl pivalate at a volume ratio of 30/20/30/20 so as to have a concentration of 1M to prepare a nonaqueous electrolyte. Five milliliters of the nonaqueous electrolyte was poured through an electrolyte pouring hole, and then impregnation treatment was performed. Then, the pouring hole was sealed with heat, and the PVdF-HFP film was heated at 60° C. for 5 hours for swelling to prepare a PVdF-HFP gel electrolyte. Here, the mass ratio of PVdF-HFP was 10% with respect to the nonaqueous electrolyte. Then, charging and discharging were performed to complete a lithium ion polymer battery having a design capacity of 1000 mAh (1 It=1000 mA).

PVF Electrolyte $LiPF_6$ was dissolved as an electrolyte salt in a nonaqueous solvent of EC, PC, DMC, and methyl pivalate at a volume ratio of 30/20/30/20 so as to have a concentration of 1M to prepare a nonaqueous electrolyte. A predetermined amount of PVF (polyvinyl formal) having an average molecular weight of 50,000 was dissolved in the nonaqueous electrolyte with respect to the total mass of the nonaqueous electrolyte. Five milliliters of the solution was poured through an electrolyte pouring hole, and then impregnation treatment was performed. Then, the pouring hole was sealed with heat, and thermal curing was performed at 60° C. for five hours. Then, charging and discharging were performed to complete a lithium ion polymer battery having a design capacity of 1000 mAh (1 It=1000 mA).

Measurement of Battery Characteristics

On each battery of Examples and Comparative Examples prepared as above, initial capacity, cycle characteristics, and nail penetration characteristics were determined by the following measurement methods.

Measurement of Initial Capacity

Each battery of Examples and Comparative Examples was charged in a constant temperature bath at 23° C. at a constant current of 0.5 It=500 mA until the battery voltage reached 4.2 V. After the battery voltage reached 4.2 V, each battery was charged at a constant voltage of 4.2 V until the current value reached (1/20) It=50 mA. Then, the battery was discharged at a constant current of 0.5 It=500 mA until the battery voltage reached 2.75 V. The discharging capacity at this time was determined as an initial capacity.

Measurement of Cycle Characteristics

Each battery of Examples and Comparative Examples was charged in a constant temperature bath at 55° C. at a constant current of 1 It=1000 mA until the battery voltage reached 4.2 V. After the battery voltage reached 4.2 V, each battery was charged at a constant voltage of 4.2 V until the current value reached (1/20) It=50 mA. After a 10-minute break, the battery was discharged at a constant current of 1 It=1000 mA until the battery voltage reached 2.75 V. The discharging capacity at this time was determined as a discharging capacity at the first cycle. This charging and discharging cycle was repeated 300 times. The discharging capacity at the 300th cycle was determined as a discharging capacity at the 300th cycle, and the temperature cycle characteristic (%) was calculated with the following formula.

Temperature cycle characteristic (%)=(discharging capacity at the 300th cycle/discharging capacity at the first cycle)×100

Measurement of Nail Penetration Characteristics

Thirty batteries of each example and comparative example were charged in a constant temperature bath at 23° C. at a constant current of 1 It=1000 mA until the battery voltage reached 4.4 V. After the battery voltage reached 4.4 V, each battery was charged at a constant voltage of 4.4 V until the current value reached (1/100) It=10 mA. An iron nail having a diameter of 2.5 mm was penetrated at a speed of 10 mm/s through the central part of the electrode assembly in each battery in an overcharged state at 23° C. After nail penetration, the batteries were left for 30 minutes, and the number of smoked or burned batteries was counted. Then, the nail penetration characteristic (%) was calculated with the following formula.

Nail penetration characteristic(%)=(the number of smoked or burned batteries/30)×100

Examples 1 to 17

Comparative Examples 1 to 7

$LiCoO_2$, having an average particle diameter of 13.1 μm and a specific surface area of 0.25 m²/g, was used as a positive electrode active material in each lithium ion polymer battery of Examples 1 to 17, and Comparative Examples 1 to 7. Hereinafter, the added amount of various coupling agents is shown as the ratio (% by mass) to the mass of a positive electrode active material.

Table 1 shows the relations between the reference symbols and the specific names of each of the gelling agents used in Examples and Comparative Examples.

TABLE 1

| Symbol | Name | Chemical structure formula | Remarks |
|---|---|---|---|
| GEL 1 | Polyethylene glycol (#200) diacrylate | $CH_2$=$CHCOO(CH_2CH_2O)_4OCCH$=$CH_2$ | |
| GEL 2 | Polyethylene glycol (#400) diacrylate | $CH_2$=$CHCOO(CH_2CH_2O)_9OCCH$=$CH_2$ | |
| GEL 3 | Tripropylene glycol diacrylate | $CH_2$=$CHCOO(CH(CH_3)CH_2O)_m$—$(CH_2CH(CH_3)O)_nOCCH$=$CH_2$ | m + n = |
| GEL 4 | Polypropylene glycol (#700) diacrylate | $CH_2$=$CHCOO(CH(CH_3)CH_2O)_m$—$(CH_2CH(CH_3)O)_nOCCH$=$CH_2$ | m + n = 12 |
| GEL 5 | 1,6-Hexanediol acrylate | $CH_2$=$CHCOO(CH_2)_6OCOCH$=$CH_2$ | |
| GEL 6 | Methoxy polyethylene glycol (#400) acrylate | $CH_2$=$CHCO(OCH_2CH_2)_9OCH_3$ | |
| GEL 7 | Phenoxy polyethylene glycol acrylate | $CH_2$=$CHCO(OCH_2CH_2)_2OC_6H_5$ | |
| GEL 8 | Polyethylene glycol (#200) dimethacrylate | $CH_2$=$C(CH_3)COO(CH_2CH_2O)_4OCC(CH_3)$=$CH_2$ | |
| GEL 9 | Ethoxylated bisphenol-A dimethacrylate | $CH_2$=$C(CH_3)COO(CH_2CH_2O)_mO$—$C_6H_4C(CH_3)_2C_6H_4$—$O(CH_2CH_2)_nOOC(CH_3)$=$CH_2CC(CH_3)$=$CH_2$ | m + n = 12 |
| GEL 10 | Tricyclodecane-dimethanol dimethacrylate | $CH_2$=$C(CH_3)COOCH_2C_{10}H_{14}CH_2OCOC(CH_3)$=$CH_2$ | |
| GEL 11 | Ethoxylated pentaerythritol tetraacrylate | $CH_2$=$CHCO(OCH_2CH_2)_mOCH_2C$ [—$(CH_2O(C_2H_4O)_qCOCH$=$CH_2)$ / —$(CH_2O(C_2H_4O)_nCOCH$=$CH_2)$ / —$(CH_2O(C_2H_4O)_pCOCH$=$CH_2)$] | m + n + p + q = 35 |

In Comparative Example 1, no gelling agent was added to the nonaqueous electrolyte, and no coupling agent was added to the positive electrode mixture layer. In Comparative Examples 2 to 4, a predetermined gelling agent was added the nonaqueous electrolyte, and no coupling agent was added to the positive electrode mixture layer.

In each of Comparative Examples 5 to 7, 0.20% by mass of aluminum bisethylacetoacetate monoacetylacetonate was added as a coupling agent to the positive electrode mixture layer, and no gelling agent (Comparative Example 5) was added or a PVdF-HFP copolymer (Comparative Example 6) or PVF (Comparative Example 7) was added as a gelling agent to the nonaqueous electrolyte.

In each of Examples 1 to 17, and Comparative Example 5, 0.20% by mass of aluminum bisethylacetoacetate monoacetylacetonate was added as a coupling agent to the positive electrode mixture layer, and a predetermined amount of a predetermined (meth)acrylate was added as a gelling agent to the nonaqueous electrolyte.

The measurements results of Examples 1 to 17, and Comparative Examples 1 to 7 are listed in Table 2. Table 2 shows the result of Example 1 in two lines for easy understanding.

TABLE 2

Positive electrode: $LiCoO_2$ Average particle diameter: 13.1 μm Specific surface area: 0.25 $m^2/g$

| | Gelling agent | | Coupling agent | | Initial capacity (mAh) | Cycle characteristics (%) | Nail penetration characteristics (%) |
|---|---|---|---|---|---|---|---|
| | Name | Amount added (% by mass) | Name | Amount added (% by mass) | | | |
| Comparative Example 1 | None | — | None | — | 1006 | 72 | 73 |
| Comparative Example 2 | GEL 1 | 5.0 | None | — | 1001 | 63 | 77 |
| Comparative Example 3 | PVdF-HFP | 10.0 | None | — | 1006 | 70 | 53 |
| Comparative Example 4 | PVF | 5.0 | None | — | 1003 | 72 | 47 |
| Comparative Example 5 | None | — | Aluminum bisethylacetoacetate monoacetylacetonate | 0.20 | 1005 | 75 | 70 |
| Example 1 | GEL 1 | 5.0 | Aluminum bisethylacetoacetate monoacetylacetonate | 0.20 | 1004 | 85 | 0 |
| Example 2 | GEL 2 | 5.0 | Aluminum bisethylacetoacetate monoacetylacetonate | 0.20 | 1002 | 85 | 0 |
| Example 3 | GEL 3 | 5.0 | Aluminum bisethylacetoacetate monoacetylacetonate | 0.20 | 1005 | 85 | 0 |
| Example 4 | GEL 4 | 5.0 | Aluminum bisethylacetoacetate monoacetylacetonate | 0.20 | 1006 | 84 | 0 |
| Example 5 | GEL 1/GEL 5 | 4.5/0.5 | Aluminum bisethylacetoacetate monoacetylacetonate | 0.20 | 1005 | 85 | 0 |
| Example 6 | GEL 6 | 5.0 | Aluminum bisethylacetoacetate monoacetylacetonate | 0.20 | 1004 | 81 | 7 |

TABLE 2-continued

Positive electrode: LiCoO$_2$ Average particle diameter: 13.1 μm Specific surface area: 0.25 m$^2$/g

| | Gelling agent | | Coupling agent | | Initial capacity (mAh) | Cycle characteristics (%) | Nail penetration characteristics (%) |
|---|---|---|---|---|---|---|---|
| | Name | Amount added (% by mass) | Name | Amount added (% by mass) | | | |
| Example 7 | GEL 7 | 5.0 | Aluminum bisethylacetoacetate monoacetylacetonate | 0.20 | 1004 | 80 | 3 |
| Example 8 | GEL 8 | 5.0 | Aluminum bisethylacetoacetate monoacetylacetonate | 0.20 | 1001 | 79 | 10 |
| Example 9 | GEL 9 | 5.0 | Aluminum bisethylacetoacetate monoacetylacetonate | 0.20 | 1005 | 78 | 3 |
| Example 10 | GEL 1/GEL 10 | 4.5/0.5 | Aluminum bisethylacetoacetate monoacetylacetonate | 0.20 | 1000 | 84 | 0 |
| Example 11 | GEL 3/GEL 11 | 4.5/0.5 | Aluminum bisethylacetoacetate monoacetylacetonate | 0.20 | 1010 | 85 | 0 |
| Comparative Example 6 | PVdF-HFP | 10.0 | Aluminum bisethylacetoacetate monoacetylacetonate | 0.20 | 1000 | 70 | 57 |
| Comparative Example 7 | PVF | 3.5 | Aluminum bisethylacetoacetate monoacetylacetonate | 0.20 | 1003 | 73 | 53 |
| Example 12 | GEL 1 | 3.5 | Aluminum bisethylacetoacetate monoacetylacetonate | 0.20 | 1000 | 81 | 3 |
| Example 13 | GEL 1 | 4.0 | Aluminum bisethylacetoacetate monoacetylacetonate | 0.20 | 1007 | 84 | 0 |
| Example 1 | GEL 1 | 5.0 | Aluminum bisethylacetoacetate monoacetylacetonate | 0.20 | 1004 | 85 | 0 |
| Example 14 | GEL 1 | 6.0 | Aluminum bisethylacetoacetate monoacetylacetonate | 0.20 | 1009 | 85 | 0 |
| Example 15 | GEL 1 | 7.0 | Aluminum bisethylacetoacetate monoacetylacetonate | 0.20 | 1004 | 84 | 0 |
| Example 16 | GEL 1 | 9.0 | Aluminum bisethylacetoacetate monoacetylacetonate | 0.20 | 1010 | 81 | 0 |
| Example 17 | GEL 1 | 10.0 | Aluminum bisethylacetoacetate monoacetylacetonate | 0.20 | 1006 | 80 | 0 |

The following facts were found based on the results listed in Table 2. First, in the batteries of Comparative Examples 2 to 7, and Examples 1 to 17, the initial capacity results did not vary substantially in comparison with that of the battery of Comparative Example 1. In the batteries of Comparative Example 3, in which a PVdF-HFP copolymer was added as a gelling agent, and of Comparative Example 4, in which PVF was added, the nail penetration characteristics were slightly improved but the cycle characteristics results did not vary substantially in comparison with the battery of Comparative Example 1. In the battery of Comparative Example 2, in which a bifunctional acrylate GEL 1 (polyethylene glycol #200 diacrylate) was added as a gelling agent, both the nail penetration characteristics and the cycle characteristics deteriorated in comparison with the battery of Comparative Example 1. Based on these results, it is clear that even when each of the gelling agents is simply added to a nonaqueous electrolyte, the cycle characteristics are not improved, and when GEL 1 as a gelling agent is added, the nail penetration characteristics are not improved.

In the battery of Comparative Example 5, in which 0.20% by mass of aluminum bisethylacetoacetate monoacetylacetonate was added as a coupling agent to the positive electrode mixture layer, unlike the battery of Comparative Example 1, both the cycle characteristics and the nail penetration characteristics were scarcely changed. Accordingly, it is clear that the cycle characteristics and the nail penetration characteristics are not improved when aluminum bisethylacetoacetate monoacetylacetonate alone is added as a coupling agent to the positive electrode mixture layer.

In the batteries of Comparative Examples 6, and 7, a PVdF-HFP copolymer (Comparative Example 6) or PVF (Comparative Example 7) was added as a gelling agent to the battery of Comparative Example 5. The improved effects of the nail penetration characteristics were almost the same as those of the batteries of Comparative Examples 3, and 4. It is revealed those when a PVdF-HFP copolymer or PVF as a gelling agent is added in combination with aluminum bisethylacetoacetate monoacetylacetonate as a coupling agent, significant effect cannot be obtained as compared with when each agent is used alone.

In contrast, the battery of Example 1, in which 0.20% by mass of aluminum bisethylacetoacetate monoacetylacetonate was added as a coupling agent to the positive electrode mixture layer and 5.0% by mass of a bifunctional acrylate GEL 1 was added as a gelling agent to the electrolyte, has superior cycle characteristics and nail penetration characteristics. In the batteries of Examples 2 to 11, the gelling agents in the batteries of Example 1 were replaced with a compound containing a varied (meth)acrylate group. The cycle characteristics and the nail penetration characteristics were significantly improved similarly to the battery of Example 1.

In the batteries of Examples 12 to 17, GEL 1 was added with a varied concentration of 3.5 to 10.0% by mass in the battery of Example 1. The cycle characteristics and the nail penetration characteristics were superior similarly to the battery of Example 1.

Based on these results, it is clear that a lithium ion polymer battery having superior cycle characteristics and nail penetration characteristics can be obtained when the positive electrode mixture layer contains aluminum bisethylacetoacetate monoacetylacetonate as a coupling agent, and the gel nonaqueous electrolyte is formed from a nonaqueous electrolyte containing a monomer having a (meth)acrylic end group.

In the battery of Example 5, in which a mixture of GEL 1 and GEL 5 (1,6-hexanediol diacrylate) was used as a gelling agent, in the battery of Example 10, in which a mixture of GEL 1 and GEL 10 (tricyclodecanedimethanol dimethacrylate) was used, and in the battery of Example 11, in which a mixture of GEL 3 (tripropylene glycol diacrylate) and GEL 11 (ethoxylated pentaerythritol tetraacrylate) was used, the cycle characteristics and the nail penetration characteristics were improved similarly to the battery of Example 1 and the like. Based on these results, it is clear that (meth)acrylates as a gelling agent may be used alone or in mixtures of the above substances.

As for the amount of a monomer having a (meth)acrylic end group added to the nonaqueous electrolyte, in the results of Examples 12 to 17, good results were obtained within the amount of 3.5 to 10.0% by mass, but when the amount added was 3.5% by mass (Example 12) or 10.0% by mass (Example 10), the cycle characteristics tend to be decreased than those of batteries having other content. Thus, the amount added is preferably 3.5% by mass or more and 10.0% by mass or less.

Examples 18 to 30

Comparative Examples 8 to 14

In the batteries of Examples 18 to 23 and Comparative Examples 8 to 12, the coupling agents in the batteries of Example 1 were replaced with other coupling agents in order to examine whether these coupling agents could provide improved effects on the cycle characteristics and nail penetration characteristics.

For the batteries of Comparative Examples 8 to 12, ferric trisacetylacetonate (Comparative Example 8), aluminum isopropylate (Comparative Example 9), aluminum sec-butyrate (Comparative Example 10), 3-methacryloxypropyltrimethoxysilane (Comparative Example 11), or 3-glycidoxypropyltrimethoxysilane (Comparative Example 12) was used as a coupling agent.

For each battery of Examples 18 to 23, various compounds represented by General Formula (I) were used as a coupling agent. The coupling agent used in each battery of Examples 18 to 23 contained an alkoxy group, except for aluminum trisacetylacetonate used in the battery of Example 19 and zirconium tetrakisacetylacetonate used in the battery of Example 23. The names of the various coupling agents used in the batteries of Examples 18 to 23 are listed in Table 2.

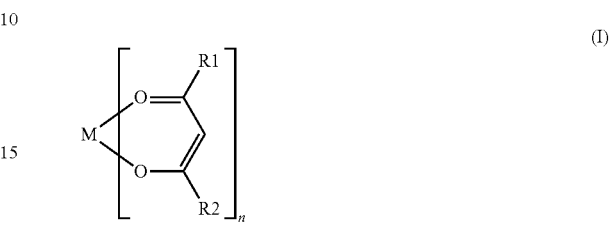

(where M is one atom selected from Al, Ti, and Zr, each of R1 and R2 is an alkyl group or an alkoxy group having 1 to 18 carbon atoms, and n represents an integer of 1 to 4.)

In Examples 24 to 30, and Comparative Examples 13, and 14, aluminum bisethylacetoacetate monoacetylacetonate was added as a coupling agent with a varied concentration of 0.003 to 7.0% by mass in the battery of Example 1 in order to examine the added amount of a coupling agent. The measurement results of the batteries of Examples 18 to 30, and Comparative Examples 8 to 14 are listed in Table 3 together with the results of Example 1, and Comparative Example 2.

TABLE 3

Positive electrode: LiCoO$_2$
Average particle diameter: 13.1 μm
Specific surface area: 0.25 m$^2$/g
Gelling agent: 5.0% by mass of GEL 1

|  | Coupling agent | | Initial capacity (mAh) | Cycle characteristics (%) | Nail penetration characteristics (%) |
|---|---|---|---|---|---|
|  | Name | Amount added (% by mass) | | | |
| Comparative Example 2 | None | — | 1001 | 63 | 77 |
| Example 18 | Aluminum ethylacetoacetate diisopropylate | 0.20 | 1003 | 83 | 0 |
| Example 19 | Aluminum trisethylacetoacetate | 0.20 | 1006 | 85 | 0 |
| Example 1 | Aluminum bisethylacetoacetate monoacetylacetonate | 0.20 | 1004 | 85 | 0 |
| Example 20 | Aluminum trisacetylacetonate | 0.20 | 1009 | 81 | 3 |
| Example 21 | Titanium bis(ethyl acetoacetate) diisopropoxide | 0.20 | 1006 | 77 | 7 |
| Example 22 | Titanium bisethylacetoacetate bisacetylacetonate | 0.20 | 1008 | 78 | 7 |
| Example 23 | Zirconium tetrakisacetylacetonate | 0.20 | 1007 | 76 | 10 |
| Comparative Example 8 | Ferric trisacetylacetonate | 0.20 | 1007 | 58 | 73 |
| Comparative Example 9 | Aluminum isopropylate | 0.20 | 1000 | 65 | 80 |
| Comparative Example 10 | Aluminum sec-butylate | 0.20 | 1007 | 67 | 80 |
| Comparative Example 11 | 3-Methacryloxypropyltrimethoxysilane | 0.50 | 1010 | 76 | 77 |
| Comparative Example 12 | 3-Glycidoxypropyltrimethoxysilane | 0.50 | 1000 | 75 | 80 |
| Comparative Example 13 | Aluminum bisethylacetoacetate monoacetylacetonate | 0.003 | 1006 | 64 | 77 |
| Example 24 | Aluminum bisethylacetoacetate monoacetylacetonate | 0.01 | 1000 | 79 | 20 |
| Example 25 | Aluminum bisethylacetoacetate monoacetylacetonate | 0.02 | 1003 | 83 | 3 |
| Example 26 | Aluminum bisethylacetoacetate monoacetylacetonate | 0.10 | 1004 | 85 | 0 |
| Example 1 | Aluminum bisethylacetoacetate monoacetylacetonate | 0.20 | 1004 | 85 | 0 |
| Example 27 | Aluminum bisethylacetoacetate monoacetylacetonate | 0.50 | 1009 | 85 | 0 |
| Example 28 | Aluminum bisethylacetoacetate monoacetylacetonate | 1.00 | 1004 | 84 | 0 |
| Example 29 | Aluminum bisethylacetoacetate monoacetylacetonate | 2.00 | 1003 | 78 | 0 |
| Example 30 | Aluminum bisethylacetoacetate monoacetylacetonate | 5.00 | 1001 | 76 | 0 |
| Comparative Example 14 | Aluminum bisethylacetoacetate monoacetylacetonate | 7.00 | 987 | 71 | 0 |

The following facts were found based on the results listed in Table 3. In the case where GEL 1 was added as a gelling agent to the electrolyte, the results of the batteries of Examples 1, and 18 to 23, in which a compound represented by Chemical Formula (I) was used as a coupling agent, were significantly better in terms of the cycle characteristics and the nail penetration characteristics than the results of the battery of Comparative Example 8, in which ferric trisacetylacetonate was used as a coupling agent, while the initial capacity results were almost the same. This reveals that it is clear when a compound represented by Chemical Formula (I) besides aluminum bisethylacetoacetate monoacetylacetonate is used as a coupling agent, significantly improved effects on the cycle characteristics and the nail penetration characteristics can be obtained.

Among those using a compound represented by Chemical Formula (I) as a coupling agent, the results of the batteries of Examples 1, and 18 to 20, in which M was Al, were better in terms of the cycle characteristics and the nail penetration characteristics than the results of the batteries of Examples 21, and 22, in which M was Ti, while the initial capacity results were almost the same, and were better in terms of the cycle characteristics than the results of the batteries of Example 23, in which M was Zr, while the initial capacity and nail penetration characteristics results were almost the same. This reveals that M is preferably Al when a compound represented by Chemical Formula (I) is used as a coupling agent.

Among the batteries of Examples 1, and 18 to 20, in which M was Al, the results of Examples 1, 18, and 19, in which R1 or R2 was an alkoxy group, show slightly better cycle characteristics and nail penetration characteristics than those of the batteries of Example 20, in which neither R1 nor R2 was an alkoxy group.

Based on the results of the batteries of Examples 1, and 24 to 30, and Comparative Examples 13, and 14, in which the amount of aluminum bisethylacetoacetate monoacetylacetonate as a coupling agent was varied from 0.003 to 7.00% by mass, when the added amount of the coupling agent was 0.003% by mass (Comparative Example 13), no addition effect of the coupling agent was observed, but when the added amount of the coupling agent was 0.01% by mass (Example 24) or more, good result was obtained in terms of both the cycle characteristics and the nail penetration characteristics in comparison with the case with no coupling agent added (Comparative Example 2). This reveals that the added amount of a coupling agent is preferably 0.01% by mass or more.

Meanwhile, when the added amount of a coupling agent was larger, the improved effects on the cycle characteristics tended to decrease, while the nail penetration characteristics remained good. In particular, when the added amount reached 7.00% by mass (Comparative Example 14), the cycle characteristics significantly decreased and the initial capacity decreased. This reveals that the added amount of a coupling agent is preferably 5.0% by mass or less.

Examples 31 to 44

And Comparative Examples 15 to 33

In the batteries of Examples 31 to 44, and Comparative Examples 15 to 33, the positive electrode active materials in Example 1, or Comparative Example 1, or 2 were changed variously in order to examine whether these positive electrode active materials could provide improved effects on the cycle characteristics and nail penetration characteristics.

In the batteries of Examples 31 to 39, and Comparative Examples 15 to 28, $LiCoO_2$, having a varied average particle diameter of 3.3 to 16.6 μm and a varied specific surface area of 0.11 to 0.90 m$^2$/g, was used as the positive electrode active material, GEL 1 was or was not added, and aluminum bisethylacetoacetate monoacetylacetonate as a coupling agent was or was not added. Furthermore, in Examples 40 to 44, and Comparative Examples 29 to 33, each of GEL 1 and aluminum bisethylacetoacetate monoacetylacetonate as a coupling agent was or was not added to the various types of the positive electrode active materials other than $LiCoO_2$.

In the batteries of Examples 31 to 44, and Comparative Examples 15 to 33, when GEL 1 and a coupling agent were added, the amount added was the same as in the battery of Example 1, that is, the added amount of GEL 1 was 5.0% by mass, and the added amount of aluminum bisethylacetoacetate monoacetylacetonate as a coupling agent was 0.2% by mass. The measurement results of the batteries of Examples 31 to 44, and Comparative Examples 15 to 33 are listed in Table 4 together with the results of the batteries of Example 1, and Comparative Examples 1, and 2.

TABLE 4

Coupling agent: aluminum bisethylacetoacetate monoacetylacetonate

| | Positive electrode type | Average particle diameter (μm) | Specific surface area (m$^2$/g) | GEL 1 (% by mass) | Coupling agent (% by mass) | Initial capacity (mAh) | Cycle characteristics (%) | Nail penetration characteristics (%) |
|---|---|---|---|---|---|---|---|---|
| Comparative Example 15 | LiCoO$_2$ | 3.3 | 0.85 | 5.0 | 0.20 | 1009 | 79 | 100 |
| Comparative Example 16 | LiCoO$_2$ | 3.5 | 0.63 | — | — | 1006 | 68 | 73 |
| Comparative Example 17 | LiCoO$_2$ | 3.5 | 0.63 | 5.0 | — | 1004 | 61 | 77 |
| Comparative Example 18 | LiCoO$_2$ | 3.5 | 0.63 | 5.0 | 0.20 | 1006 | 79 | 73 |
| Example 31 | LiCoO$_2$ | 4.5 | 0.55 | 5.0 | 0.20 | 1004 | 81 | 7 |
| Example 32 | LiCoO$_2$ | 4.6 | 0.72 | 5.0 | 0.20 | 1009 | 81 | 7 |
| Comparative Example 19 | LiCoO$_2$ | 5.2 | 0.90 | — | — | 1003 | 65 | 83 |
| Comparative Example 20 | LiCoO$_2$ | 5.2 | 0.90 | 5.0 | — | 1006 | 59 | 80 |
| Comparative Example 21 | LiCoO$_2$ | 5.2 | 0.90 | 5.0 | 0.20 | 1007 | 82 | 83 |
| Example 33 | LiCoO$_2$ | 5.5 | 0.80 | 5.0 | 0.20 | 1006 | 85 | 7 |
| Example 34 | LiCoO$_2$ | 5.7 | 0.67 | 5.0 | 0.20 | 1004 | 83 | 3 |
| Example 35 | LiCoO$_2$ | 6.1 | 0.49 | 5.0 | 0.20 | 1005 | 83 | 0 |
| Example 36 | LiCoO$_2$ | 9.7 | 0.38 | 5.0 | 0.20 | 1007 | 85 | 0 |
| Comparative Example 22 | LiCoO$_2$ | 14.3 | 0.11 | — | — | 1002 | 70 | 60 |
| Comparative Example 23 | LiCoO$_2$ | 14.3 | 0.11 | 5.0 | — | 1008 | 64 | 63 |
| Comparative Example 24 | LiCoO$_2$ | 14.3 | 0.11 | 5.0 | 0.20 | 1009 | 62 | 0 |
| Comparative Example 1 | LiCoO$_2$ | 13.1 | 0.25 | — | — | 1006 | 72 | 73 |
| Comparative Example 2 | LiCoO$_2$ | 13.1 | 0.25 | 5.0 | — | 1001 | 63 | 77 |
| Example 1 | LiCoO$_2$ | 13.1 | 0.25 | 5.0 | 0.20 | 1004 | 85 | 0 |

TABLE 4-continued

Coupling agent: aluminum bisethylacetoacetate monoacetylacetonate

| | | Physical properties of positive electrode | | | | | | |
|---|---|---|---|---|---|---|---|---|
| | Positive electrode type | Average particle diameter (μm) | Specific surface area (m²/g) | GEL 1 (% by mass) | Coupling agent (% by mass) | Initial capacity (mAh) | Cycle characteristics (%) | Nail penetration characteristics (%) |
| Example 37 | LiCoO$_2$ | 14.6 | 0.22 | 5.0 | 0.20 | 1003 | 84 | 0 |
| Example 38 | LiCoO$_2$ | 15.2 | 0.18 | 5.0 | 0.20 | 1003 | 81 | 0 |
| Example 39 | LiCoO$_2$ | 15.5 | 0.13 | 5.0 | 0.20 | 1000 | 83 | 0 |
| Comparative Example 25 | LiCoO$_2$ | 16.4 | 0.16 | — | — | 1008 | 72 | 70 |
| Comparative Example 26 | LiCoO$_2$ | 16.4 | 0.16 | 5.0 | — | 1010 | 64 | 73 |
| Comparative Example 27 | LiCoO$_2$ | 16.4 | 0.16 | 5.0 | 0.20 | 1007 | 63 | 0 |
| Comparative Example 28 | LiCoO$_2$ | 16.6 | 0.12 | 5.0 | 0.20 | 1008 | 60 | 0 |
| Comparative Example 29 | LiMn$_{1/3}$Ni$_{1/3}$Co$_{1/3}$O$_2$ | 10.3 | 0.49 | — | — | 1000 | 74 | 43 |
| Example 40 | LiMn$_{1/3}$Ni$_{1/3}$Co$_{1/3}$O$_2$ | 10.3 | 0.49 | 5.0 | 0.20 | 1000 | 83 | 0 |
| Comparative Example 30 | LiMn$_2$O$_4$ | 12.7 | 0.58 | — | — | 1003 | 83 | 40 |
| Example 41 | LiMn$_2$O$_4$ | 12.7 | 0.58 | 5.0 | 0.20 | 1006 | 86 | 0 |
| Comparative Example 31 | LiNiO$_2$ | 10.8 | 0.32 | — | — | 1002 | 81 | 100 |
| Example 42 | LiNiO$_2$ | 10.8 | 0.32 | 5.0 | 0.20 | 1004 | 85 | 13 |
| Comparative Example 32 | LiNi$_{0.85}$Co$_{0.15}$O$_2$ | 10.2 | 0.31 | — | — | 1005 | 83 | 100 |
| Example 43 | LiNi$_{0.85}$Co$_{0.15}$O$_2$ | 10.2 | 0.31 | 5.0 | 0.20 | 1006 | 86 | 7 |
| Comparative Example 33 | LiCo$_{0.99}$Al$_{0.01}$O$_2$ | 9.3 | 0.44 | — | — | 1002 | 84 | 73 |
| Example 44 | LiCo$_{0.99}$Al$_{0.01}$O$_2$ | 9.3 | 0.44 | 5.0 | 0.20 | 1010 | 86 | 0 |

The following facts were found based on the results listed in Table 4. First, in the batteries of Examples 31 to 44, and Comparative Examples 15 to 33, the initial capacity results did not greatly vary. In the batteries of Comparative Examples 16, 19, 22, and 25, LiCoO$_2$ having a different average particle diameter and specific surface area from those in the battery of Comparative Example 1 was used as the positive electrode active material. The cycle characteristics and the nail penetration characteristics were almost the same as those of the battery of Comparative Example 1 because neither GEL 1 nor a coupling agent was added. In the batteries of Comparative Examples 17, 20, 23, and 26, LiCoO$_2$ having a different average particle diameter and specific surface area from those in the battery of Comparative Example 2 was used as the positive electrode active material. The cycle characteristics and the nail penetration characteristics were almost the same as those of the battery of Comparative Example 2 because GEL 1 was added but no coupling agent was added.

Based on these results, it is clear that when neither GEL 1 nor a coupling agent was added, improved effects on the cycle characteristics and nail penetration characteristics cannot be obtained, regardless of the average particle diameter and the specific surface area of a positive electrode active material.

In contrast, in the batteries of Examples 31 to 39, and Comparative Examples 15, 18, 21, 24, 27, and 28, LiCoO$_2$ having a different average particle diameter and specific surface area from those in the battery of Example 1 was used as the positive electrode active material, and GEL 1 and a coupling agent were added. In the batteries of Examples 31 to 39, both the cycle characteristics and the nail penetration characteristics were very good. However, in the batteries of Comparative Examples 15, 18, and 21, the addition effects of GEL 1 and the coupling agent were not obtained. In the batteries of Comparative Examples 24, 27, and 28, the nail penetration characteristics were very good but the cycle characteristics deteriorated.

In other words, based on the comparison of the batteries of Examples 31, and 32, and the batteries of Comparative Examples 15, and 18, it is clear that the positive electrode active material preferably has an average particle diameter of 4.5 μm or more. Based on the comparison of the batteries of Examples 38, and 39, and the batteries of Comparative Examples 27, and 28, it is clear that the positive electrode active material preferably has an average particle diameter of 15.5 μm or less.

In consideration of the results of the batteries of Comparative Examples 21, and 24, in which a positive electrode active material satisfying an average particle diameter of 4.5 μm or more and 15.5 μm or less was used, it is clear that the positive electrode active material preferably has a specific surface area of 0.80 m²/g or less based on the comparison of the batteries of Examples 32, and 33, and the battery of Comparative Example 21, and that the positive electrode active material preferably has a specific surface area of 0.13 m²/g or more based on the comparison of the battery of Example 39 and the battery of Comparative Example 24.

The measurement results of Examples 40 to 44, and Comparative Examples 29 to 33 will be discussed. In the batteries of Examples 40 to 44, and Comparative Examples 29 to 33, LiMn$_{1/3}$Ni$_{1/3}$Co$_{1/3}$O$_2$ (Example 40, and Comparative Example 29), LiMn$_2$O$_4$ (Example 41, and Comparative Example 30), LiNiO$_2$ (Example 42, and Comparative Example 31), LiNi$_{0.85}$Co$_{0.15}$O$_2$ (Example 43, and Comparative Example 32), or LiCo$_{0.99}$Al$_{0.01}$O$_2$ (Example 44, and Comparative Example 30) was used as a positive electrode active material, and neither GEL 1 nor a coupling agent was contained (Comparative Examples 29 to 33), or both GEL 1 and a coupling agent were contained (Examples 40 to 44). In the batteries of Examples 40 to 44, and Comparative Examples 29 to 33, the average particle diameter of the positive electrode active material was within a range of 4.5 to 15.5 μm and the specific surface area was within a range of 0.13 to 0.80 m²/g.

Based on the results listed in Table 4, with any of LiMn$_{1/3}$Ni$_{1/3}$Co$_{1/3}$O$_2$, LiMn$_2$O$_4$, LiNiO$_2$, LiNi$_{0.85}$Co$_{0.15}$O$_2$, or LiCo$_{0.99}$Al$_{0.01}$O$_2$ used as a positive electrode active material, when the batteries contained both GEL 1 and a coupling agent (Examples 40 to 44), both the cycle characteristics and the nail penetration characteristics were better than the batteries contained neither GEL 1 nor a coupling agent (Comparative Examples 29 to 33). Therefore, it is clear that the results of the study on using LiCoO$_2$ as a positive electrode active material in the batteries of First to Thirty-Ninth Examples 1 to 39, and Comparative Examples 1 to 28 can be equally applied to positive electrode active materials made of a lithium composite oxide that are commonly used in nonaqueous secondary batteries.

What is claimed is:

1. A lithium ion polymer battery comprising:
a positive electrode plate formed with a positive electrode mixture layer having a lithium composite oxide as a positive electrode active material;
a negative electrode plate;
a separator; and
a gel nonaqueous electrolyte,
the positive electrode active material having an average particle diameter of 4.5 to 15.5 μm and a specific surface area of 0.13 to 0.80 m²/g,
the positive electrode mixture layer containing at least one coupling agent represented by General Formula (I) at a content of 0.01% by mass or more and 5% by mass or less with respect to the mass of the positive electrode active material, and
the gel nonaqueous electrolyte being formed from a nonaqueous electrolyte containing a monomer having a (meth)acrylic end group:

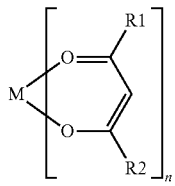
(I)

(where M is one atom selected from Al, Ti, and Zr, each of R1 and R2 is an alkyl group or an alkoxy group having 1 to 18 carbon atoms, and n represents an integer of 1 to 4);
wherein a part of the coupling agent is thermally decomposed by short circuit heat at the time of nail penetration to form an insulating layer between the polymer electrolyte and the positive electrode mixture.

2. The lithium ion polymer battery according to claim 1, wherein M is Al.

3. The lithium ion polymer battery according to claim 1, wherein at least one of R1 and R2 is an alkoxy group.

4. The lithium ion polymer battery according to claim 1, wherein the coupling agent is at least one selected from aluminum ethylacetoacetate diisopropylate, aluminum trisethylacetoacetate, aluminum bisethylacetoacetate monoacetylacetonate, and aluminum trisacetylacetonate.

5. The lithium ion polymer battery according to claim 1, wherein the monomer having a (meth)acrylic end group is at least one selected from polyethylene glycol diacrylate, tripropylene glycol diacrylate, polypropylene glycol diacrylate, 1,6-hexanediol acrylate, methoxy polyethylene glycol acrylate, phenoxy polyethylene glycol acrylate, polyethylene glycol dimethacrylate, ethoxylated bisphenol-A dimethacrylate, tricyclodecanedimethanol dimethacrylate, and ethoxylated pentaerythritol tetraacrylate.

6. The lithium ion polymer battery according to claim 1, wherein the nonaqueous electrolyte further includes at least one of the group consisting of: vinylene carbonate (VC), vinyl ethyl carbonate (VEC), succinic anhydride (SUCAH), maleic anhydride (MAAH), glycolic anhydride, ethylene sulfite (ES), divinyl sulfone (VS), vinyl acetate (VA), vinyl pivalate (VP), catechol carbonate, and biphenyl (BP).

* * * * *